June 4, 1940.   C. F. BARTEL ET AL   2,203,007
CUSHION ASSEMBLY
Filed May 7, 1938   2 Sheets-Sheet 1
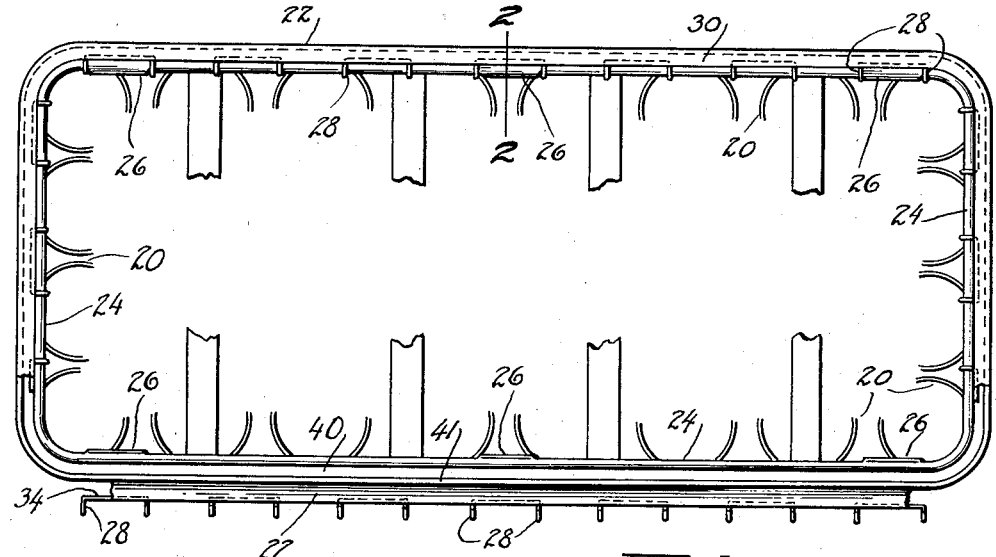
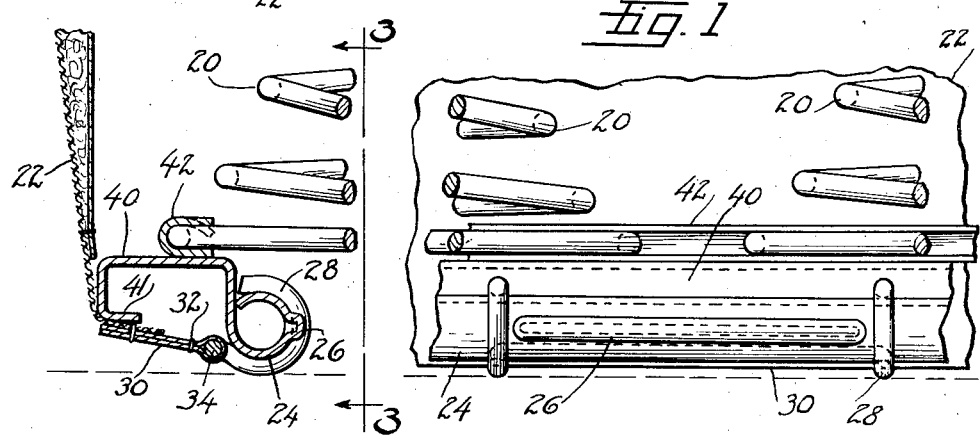
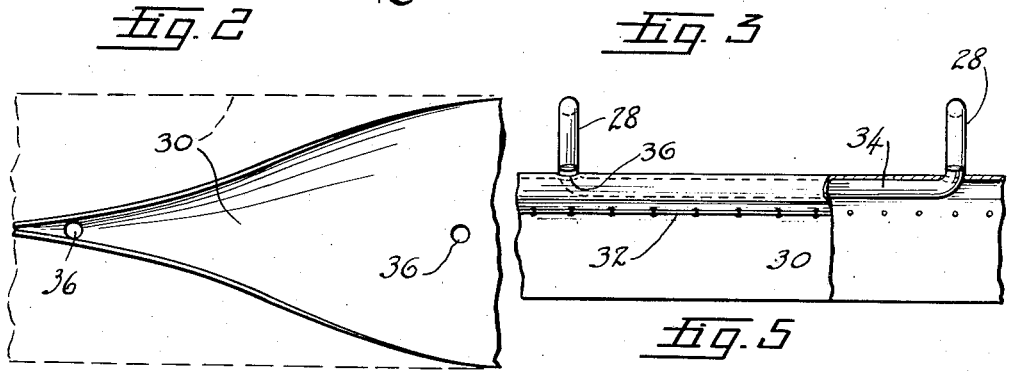
INVENTORS
WILLIAM CARL BARTEL and CHARLES F. BARTEL
BY
Parker & Burton
ATTORNEYS

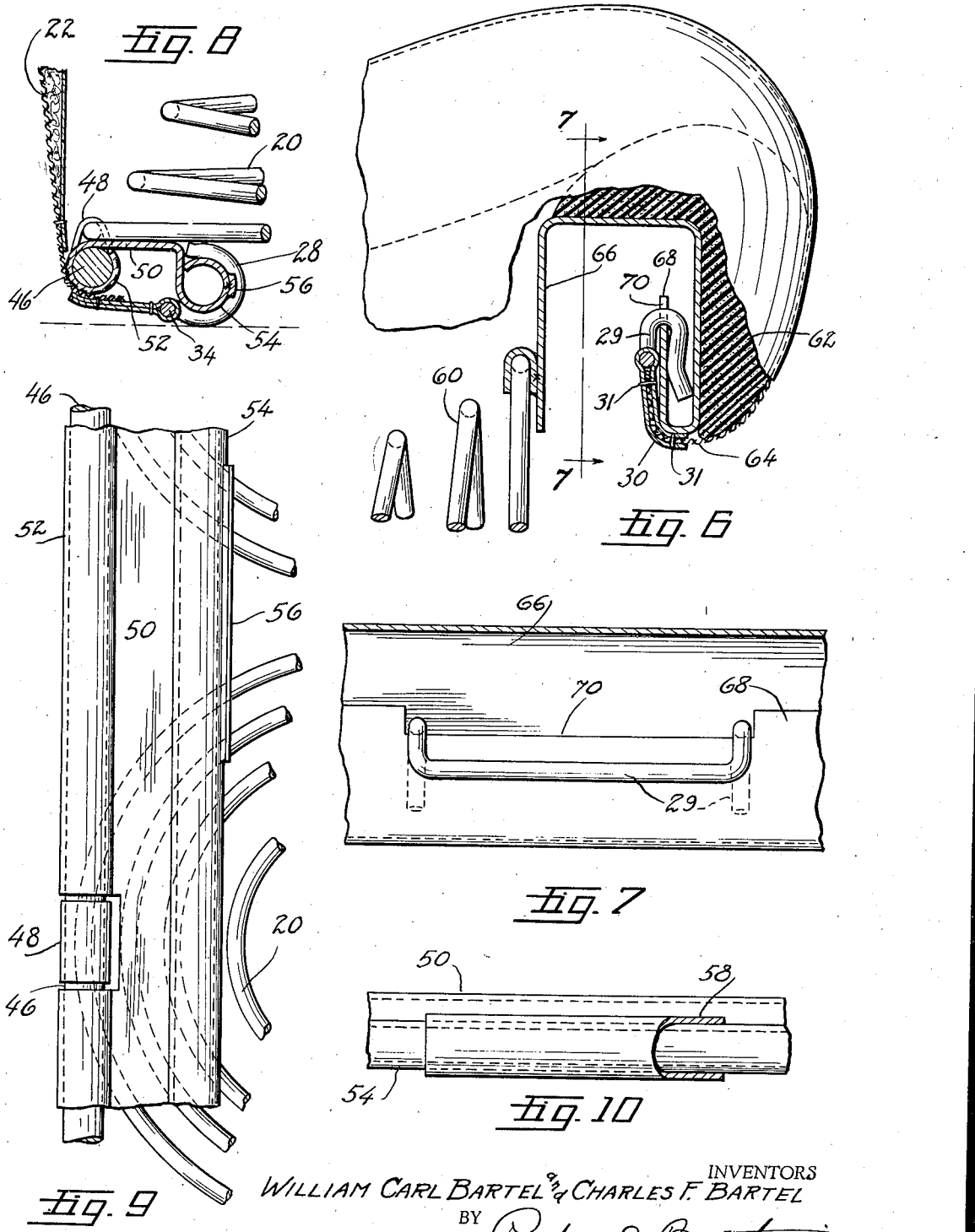

Patented June 4, 1940

2,203,007

UNITED STATES PATENT OFFICE 2,203,007

CUSHION ASSEMBLY

Charles F. Bartel and William Carl Bartel, Royal Oak, Mich., assignors, by mesne assignments, to Calvin A. Hooker and I. Louis Carron, as trustees Application May 7, 1938, Serial No. 206,598

3 Claims. (Cl. 155—180)

This invention relates to improvements in cushion assemblies and particularly to the spring cushion assembly such as is used in automobile bodies.

The invention pertains to improved means for securing the upholstery cloth or trim material upon the cushion in such manner that it may be readily secured thereto by unskilled labor and it may be readily and quickly detached therefrom for replacement or cleaning.

Heretofore it has been the practice to provide a spring cushion with tacking strips extending along its side margins on its under face. The trim cloth or whatever trim material was used was then stretched over the outer face and side faces of the cushion and its edges were tacked down to the tacking strips on the under edge. This type of assembly required care and exactness in the tacking down of the trim material so that it would be properly stretched and even throughout.

If the trim material were provided with beads or piping as was commonly the character it was necessary to line up the beads or piping in the back cushion. This also made for exactness and accuracy in the securement of the trim cloth in place. Otherwise the beads would not be lined up. It was not readily possible to remove trim material so secured in place either for cleaning or repair and skilled labor was required to attach the trim material to either the seat cushions or seat back.

This invention is directed to the provision of means whereby trim material may be detachably hooked in place. The construction is inexpensive and the application of the material is easily accomplished. The construction is such that it may be applied to spring cushions of the type which are now in common use with only minor changes being made therein. The invention is readily applicable to any type of trim material. The trim material may be quickly attached in place and as quickly detached.

Other objects, advantages, and meritorious features of our invention will more fully appear from the following description, appended claims, and accompanying drawings wherein:

Figure 1 is a plan view of the underside of a seat cushion with part of the upholstery cloth at the two lower corners broken away and with such upholstery cloth detached along the lower side but shown as attached along the top and ends, Fig. 2 is a fragmentary cross sectional view taken on line 2—2 of Fig. 1, Fig. 3 is an elevation of the fragment shown in Fig. 2 taken on line 3—3, Fig. 4 is an elevation of a fragment of the selvage strip which carries the trim material hooks, Fig. 5 is another elevation of a fragment of the selvage strip showing the same sewed and carrying a hook member, Fig. 6 is a fragmentary section partly in elevation through a seat back.

Fig. 7 is a fragmentary section taken on line 7—7 of Fig. 6,

Fig. 8 is a view similar to Fig. 2 but showing a slightly alternative form of construction, Fig. 9 is a view upon the underside of a fragment of the seat back structure shown in Fig. 8 with the fabric or trim material and the fastening hooks omitted, and Fig. 10 is an elevation of a fragment of a slightly modified type of hook engageable frame element.

The invention is adaptable either to the seat cushion or seat back and in Fig. 1 it is shown as applied to a seat cushion and in certain fragmentary views it is shown as applied to a seat back. The general construction is the same. The specific embodiment of attaching hooks and hook engaging elements might be modified slightly in the seat back as compared with the seat cushion. Such cushion comprises an outer face which would be the top face of the seat cushion and the front face of the seat back but which is herein termed the outer face. It also comprises side faces which constitute the front and back face of the seat cushion and the top and bottom face of the back cushion and the end faces of both. Each cushion has also what is here termed an inner face, which would be the under surface of the seat cushion and the back surface of the seat back. For uniformity of terminology the phrase "outer" face, "inner" face, and "side" faces, are used as referring to either the seat or back cushions except where specificity is necessary.

The spring cushion structure is generally conventional. It comprises a frame which carries a series of springs. Wadding or padding is spread over the springs and trim cloth or some kind of trim material is stretched over the wadding over the outer surface of each cushion and down over the side faces and onto the inner surface or face.

Instead of providing the usual tacking strips in the cushion frame and tacking this trim material in place we provide what may be termed a retainer element or a hook engageable element that extends along each margin of the inner face of the cushion and is here shown as spaced interiorly of such machine.

The details of the conventional spring cushion are not here shown but in Fig. 1 the underside of such cushion, here being the seat cushion, is illustrated. The coil springs are indicated as 20. On top of these coil springs are provided padding, not illustrated in this view, and trim material 22 is stretched thereover. The cushion is provided on its underside with a hook engageable element or portion 24 which extends around its margin spaced interiorly from the margin and which is provided at spaced intervals with positioning stops 26. A plurality of hooks indicated as 28 are secured to the margin of the trim cloth. These hooks are adapted to engage over the element 24 as more particularly shown in other figures of the drawings such as Figs. 2, 3, and 8.

In order to conveniently attach the hooks to the trim cloth and to provide a wear resisting margin that underlies the cushion frame we prefer to provide a selvage strip which carries the hooks. This selvage strip is indicated in Fig. 4 wherein it is shown as being folded into the form shown in Fig. 5. The selvage strip is indicated as 30. In Fig. 2 it is shown as stitched to the trim cloth. It is also stitched together as shown in Fig. 5 at 32.

One form of hook which we find particularly suitable is a U-shaped hook shown in Figs. 1, 2, 3 and 5. It has a base portion 34 which is shown in Fig. 5 as seated within the fold of the selvage strip and held in place by the stitching 32 with the legs of the hook extending through apertures provided in the selvage strip and indicated in Fig. 4 as 36. The ends of this U-shaped hook are turned over as at 28, so that they will engage as shown in Fig. 2 over a roll or rod or tube formed on the margin of a frame member 40 which frame member 40 is secured to the springs. One method of securing the same is shown in Fig. 2 where a channel element 42 is shown as welded to the frame member 40 and engaging the lower coil of a coil spring 20. This same construction is also shown in Fig. 3.

This frame member 40 has, it will be seen, an outer margin portion over which the trim cloth is stretched as at 41 and its inner marginal portion is provided with the tubular formation 24. This inner marginal portion is spaced from the outer marginal portion inwardly therefrom.

In the attachment of the trim material over the cushion the hooks are secured along one edge to the inner edge of the frame element and the trim material is stretched over the outer face of the cushion and down over the outer sides and the hooks along the opposite margin are engaged over the inner edge of the frame element along such margin against the inherent tension of the spring cushion so that the trim material is held taut thereby and the hooks are held snugly in position.

It will be seen that there are provided what might be termed positioning stops 26 which are here shown as enlargements or protuberance 26 of the tube 24 and which are spaced linearly therealong to certain of the hooks engaging these stops so that the trim cloth is held against shifting and so that it is lined up so as to stretch over the cushion and bring any decorative lines into alignment, and also to insure correct and accurate placing of the trim material in position. It is apparent that the trim material can be as easily detached as it has been attached and that it is therefore feasible to remove it for cleaning or repair and that such can be accomplished readily.

In Figs. 6 to 8 of the drawings certain modified constructions are shown. For example, in Fig. 8 instead of the sheet metal frame member 40 illustrated in Fig. 2 there is provided a solid marginal wire 46 which is secured to the coil springs 20 by parts 48 as shown in Figs. 8 and 9. There is then secured to this wire a sheet metal frame element 50. It has a portion 52 that is wrapped around the wire as shown in Figs. 8 and 9 and which forms the outer marginal edge of the frame member. It has an inner marginal edge which may be in a tubular form as shown in Figs 8 and 9 and which is indicated as 54 and which may be provided with stop portions 56 for the same purpose as the stop portion 26 shown in Fig. 1. In Fig. 9 the trim cloth is shown as removed. In Fig. 8 the trim cloth 22 is shown as provided with hooks 28 heretofore described and which are hooked over the inner marginal edge portion 54 of the hook engageable element or frame element.

In Fig. 10 a stop member 58 is shown as welded or otherwise secured to the inner edge portion of the frame member here indicated as 50.

In Figs. 6 and 7 the securement of the trim cloth by a slightly different form of hook is illustrated. This is shown in connection with the upper edge of the seat back. The coil springs are indicated as 60. Padding, sponge rubber, or any other cushioning material 62 may be provided as shown and the trim cloth 64 stretched thereover. In this view the edge of the trim cloth is shown as embraced between the two portions of the selvage strip 30, which selvage strip is stitched thereto along the lines 31. The frame member is here indicated as 66 and is of channel shape. It has an inner marginal edge portion indicated as 68. This inner marginal edge portion may be cut out as at 70 to provide a recess within which the hook here indicated as 29 may be engaged. It will be noted that this hook 29 is shaped so that its outer end is so distorted when it is positioned over the edge of the frame 68 that it is wedged between this inner edge portion 68 and the opposite side wall of the channel so as to be frictionally held in place. The trim cloth is stretched down and secured to the opposite or lower edge of the seat, back, and along such lower edge a construction such as shown in Fig. 8 may be used or a structure such as is shown in Fig. 2. If desired, the construction of Fig. 6 may be located in the reverse direction or with the open mouth of the channel upwardly. The ends are, of course, fastened down similarly as shown in Fig. 1.

What we claim:

1. A cushion frame assembly comprising a spring cushion having an outer face and an inner face and side faces and provided upon its inner face with a channel frame member extending along the margin and having one side wall of its channel positioned to serve as an outer marginal wall and having the opposite side wall of its channel rolled over upon itself outwardly of the channel in the form of a tube, trim material stretched over said outer face and side faces and inturned over the outer marginal wall of the channel toward the opposite wall thereof, and hook members secured to the margin of said trim material and engaged over the rolled over tubular portion of the inner wall of the channel.

2. A cushion frame assembly comprising a spring cushion having an outer face and an inner face and side faces and provided upon its inner face with a channel frame member extending along the margin and having one side wall of its channel positioned to serve as an outer marginal wall and having the opposite side wall of its channel rolled over upon itself outwardly of the channel in the form of a tube, trim material stretched over said outer face and side faces and inturned over the outer marginal wall of the channel toward the opposite wall thereof, a selvage strip folded upon itself and extending along the margin of said trim material and having its edge portions secured thereto, a plurality of U-shaped members secured at spaced apart intervals along said selvage strip with the base of each U hook seated within the fold of the strip and with the two legs of each hook extending through the fold in the strip and provided with hook ends engaged over the tubular roll of the inner wall of the channel frame element.

3. A cushion frame assembly comprising a spring cushion having an outer face and an inner face and side faces and provided upon its inner face with a channel frame member extending along the margin and having one side wall of its channel positioned to serve as an outer marginal wall and having the opposite side wall of its channel rolled over upon itself outwardly of the channel in the form of a tube, trim material stretched over said outer face and side faces and inturned over the outer marginal wall of the channel toward the opposite wall thereof, a selvage strip folded upon itself and extending along the margin of said trim material and having its edge portions secured thereto, a plurality of U-shaped members secured at spaced apart intervals along said selvage strip with the base of each U hook seated within the fold of the strip and with the two legs of each hook extending through the fold in the strip and provided with hook ends engaged over the tubular roll of the inner wall of the channel frame element, said tubular roll of the inner wall of the channel frame element being provided with linearly extending ridges or detents formed therein, each of a length to be received between the two legs of a U hook positioning the hook linearly upon the roll.

WILLIAM CARL BARTEL.
CHARLES F. BARTEL.